D. CLAUDE, Jr.
Grain Separator.
No. 2,974.  Patented Feb. 24, 1843.
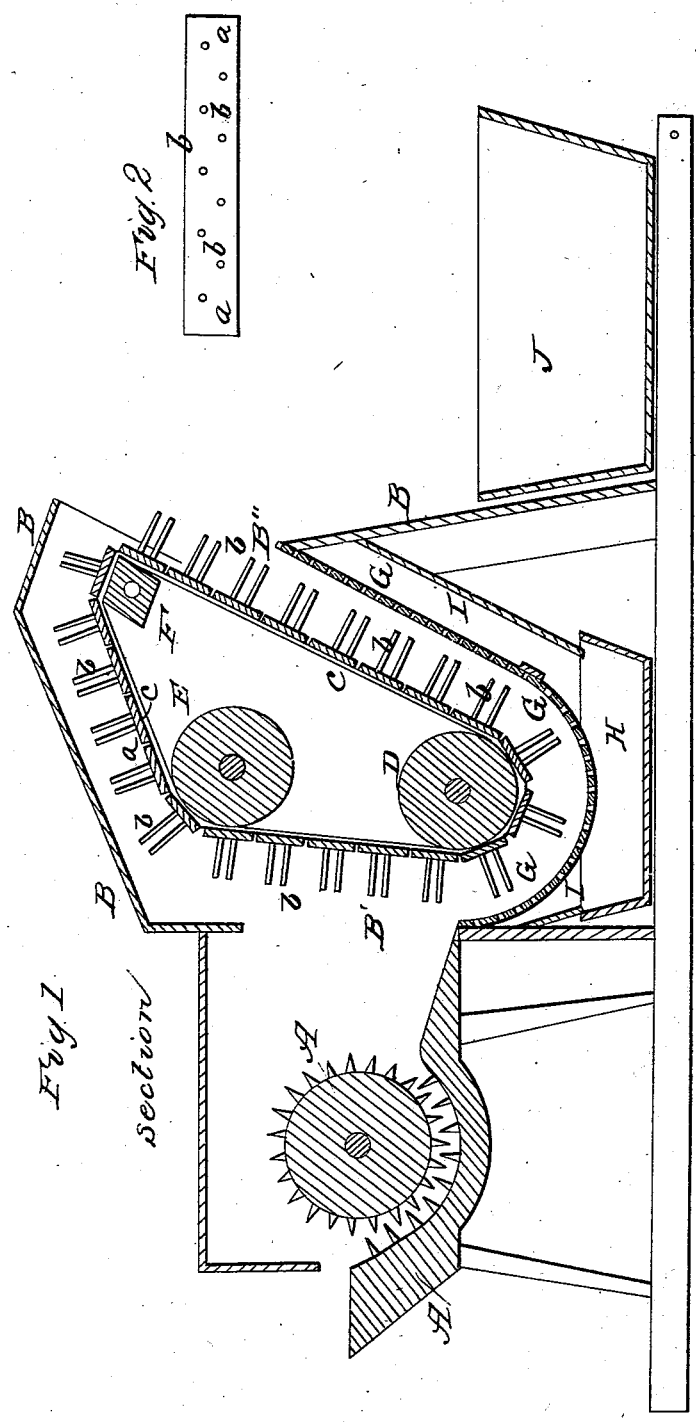

UNITED STATES PATENT OFFICE.

DENNIS CLAUDE, JR., OF ANNAPOLIS, MARYLAND.

SEPARATOR.

Specification of Letters Patent No. 2,974, dated February 24, 1843.

*To all whom it may concern:*

Be it known that I, DENNIS CLAUDE, Jr., of Annapolis, in the county of Anne Arundel, in the State of Maryland, have invented a new and useful grain-separator or machine for separating the grain from the straw as they are delivered from a threshing-machine; and I do hereby declare that the following is a full and exact description thereof.

My grain separator is to be attached to, and may be used in combination with, a threshing machine of any of the constructions in ordinary use, and will effectually separate the grain from the straw, as rapidly as it is supplied by the threshing machine.

It consists, mainly, of an endless band of rakes which is made to revolve in a suitable case, the lower portion of which constitutes a concave sieve, or screen, through which the grain will fall, while the straw is turned over, carried around, and delivered from the machine, at its rear side, without waste of grain.

In the accompanying drawing, Figure 1, is a vertical section through my machine, from front to back, and also of a threshing machine to which it is represented as attached. Fig. 2, shows one of the slats, or rake heads, into which the teeth are fixed, and which when combined constitute the endless band of rakes.

A, A, are the cylinder and concave of an ordinary threshing machine.

B, B, B, is the case which incloses the sides of my separator, leaving an opening from end to end at B′, for the passage of the straw and grain into it, and at B″, for the delivery of the straw therefrom. The case B, B, must be as wide as the length of the cylinder threshing machine to which it is attached, and is to be inclosed at its ends.

C, C, C, is the endless band of rakes, which is composed of slats of wood $a$, $a$, $a$, into which are inserted teeth $b$, $b$, of wire, or other suitable material. The slats are hinged, or connected together by bands of leather attached to their inner sides. This endless band passes around rollers D, E, F, the axes of which have their bearings in the sides of the machine.

F, is the driving roller, which is made square, or polygonal, and may receive motion by a whirl and band on one of its gudgeons, said band leading either from the threshing machine, or from the first motive power. The rollers E, or F, may be made adjustable for the purpose of tightening the band.

G, G, is a sieve, or screen, which may be made of wire, or of perforated sheet metal, having holes, or meshes, through which the grain will pass.

H, is a box, or trough, in which the grain may be received.

I, I, are boards which may be employed to conduct it into the box.

J, is a box, or basket, which may be placed to receive the straw as it falls from the machine, and in which it may be trodden down, so as to be removed with facility.

In using this machine, the straw and grain are thrown into it at the opening B′, by the action of the threshing machine itself, which is placed against it, and confined in place in any suitable manner. The straw is caught by the teeth $b$, $b$, by the revolution of which the straw is turned over, the grain made to pass through the screen, being effectually thereby separated from the straw, and the latter is delivered through the opening B″ at the back of the machine.

Having thus fully described the manner of constructing, and the action of, my grain separator, what I claim therein as new, and desire to secure by Letters Patent, is—

The manner in which I have arranged the revolving band of rakes, so as to revolve within a case, furnished with a concave screen at its lower end, and with openings for the introduction of the straw and grain from a threshing machine, and for the delivery of the straw; the whole being formed, and operating, substantially in the manner, and for the purpose, herein set forth.

DENNIS CLAUDE, JUNIOR.

Witnesses:
THOS. P. JONES,
JOHN HITZ.